(12) United States Patent
Huang et al.

(10) Patent No.: US 9,820,166 B2
(45) Date of Patent: Nov. 14, 2017

(54) BASE STATION AND BEAM COVERAGE METHOD

(71) Applicant: HUAWEI TECHNOLOGIES CO., LTD., Guangdong (CN)

(72) Inventors: Guolong Huang, Chengdu (CN); Hua Cai, Chengdu (CN); Bo Yang, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/244,939

(22) Filed: Aug. 23, 2016

(65) Prior Publication Data

US 2016/0360425 A1    Dec. 8, 2016

Related U.S. Application Data

(63) Continuation of application No. PCT/CN2014/080336, filed on Jun. 19, 2014.

(51) Int. Cl.
*H04M 1/00* (2006.01)
*H04W 16/28* (2009.01)
(Continued)

(52) U.S. Cl.
CPC ............ *H04W 16/28* (2013.01); *H01Q 1/246* (2013.01); *H01Q 3/24* (2013.01); *H01Q 3/34* (2013.01);
(Continued)

(58) Field of Classification Search
CPC ......... H04W 16/28; H01Q 1/246; H01Q 3/24; H01Q 21/00
(Continued)

(56) References Cited

U.S. PATENT DOCUMENTS 5,999,145 A * 12/1999 Niekamp ............. H01Q 1/1242
343/800
6,353,410 B1     3/2002 Powell et al.
(Continued)

FOREIGN PATENT DOCUMENTS

CN        101895897 A      11/2010
CN        102142614 A       8/2011
(Continued)

OTHER PUBLICATIONS

International Search Report issued Mar. 25, 2015, in international application No. PCT/CN2014/080336.
(Continued)

*Primary Examiner* — Sonny Trinh
(74) *Attorney, Agent, or Firm* — Kilpatrick Townsend & Stockton LLP

(57) ABSTRACT

Embodiments of the present disclosure provide a base station and a beam coverage method, which can improve a service capacity of a communications system. The base station includes: an antenna and at least two data transmission paths, where a data converter and a beamformer are disposed on each data transmission path; the antenna includes a beam aggregation structure and at least one antenna bay, the beam aggregation structure includes at least one antenna aperture, one beamformer is correspondingly connected to one antenna bay, one antenna bay uses at least one antenna aperture in the beam aggregation structure to receive and send a beam, and a multiplexer is further disposed on the at least two data transmission paths; and the multiplexer is configured to set a data transmission path of a to-be-transmitted signal or a radiation signal. The embodiments of the present disclosure are used for beam coverage.

20 Claims, 10 Drawing Sheets

(51) Int. Cl.
*H01Q 21/00* (2006.01)
*H04W 16/18* (2009.01)
*H01Q 1/24* (2006.01)
*H01Q 3/24* (2006.01)
*H01Q 3/34* (2006.01)
*H04B 7/06* (2006.01)

(52) U.S. Cl.
CPC ........... *H01Q 21/00* (2013.01); *H04B 7/0617* (2013.01); *H04W 16/18* (2013.01)

(58) Field of Classification Search
USPC .................... 455/25, 63.4, 562.1, 575.7, 107
See application file for complete search history.

(56) References Cited

U.S. PATENT DOCUMENTS

| | | | | |
|---|---|---|---|---|
| 8,594,053 | B2* | 11/2013 | Kim | .................... H04W 72/046 342/359 |
| 9,462,599 | B2 | 10/2016 | Gao et al. | |
| 2004/0077379 | A1 | 4/2004 | Smith et al. | |
| 2004/0214606 | A1* | 10/2004 | Wichman | ............. H04B 7/0408 455/562.1 |
| 2006/0084474 | A1 | 4/2006 | Iacono et al. | |
| 2010/0296439 | A1 | 11/2010 | Leung et al. | |
| 2011/0065448 | A1 | 3/2011 | Song et al. | |
| 2011/0109497 | A1 | 5/2011 | Yano | |
| 2014/0073337 | A1 | 3/2014 | Hong et al. | |

FOREIGN PATENT DOCUMENTS

| | | |
|---|---|---|
| CN | 102751592 A | 10/2012 |
| CN | 102916735 A | 2/2013 |
| CN | 103812546 A | 5/2014 |

OTHER PUBLICATIONS

European Search Report issued on May 10, 2017 in the corresponding European application (application No. 14895282.3).

* cited by examiner

BASE STATION AND BEAM COVERAGE METHOD

CROSS REFERENCE

This Application is a continuation of International Application No. PCT/CN2014/080336, filed on Jun. 19, 2014, which is hereby incorporated by reference in its entirety.

TECHNICAL FIELD

Embodiments of the present disclosure relate to the communications field, and in particular, to a base station and a beam coverage method.

BACKGROUND

In 2G to 4G mobile communications systems, a cell is generally divided into three sectors or six sectors according to a hexagon, where each sector performs communications service transmission by using a broadcast beam or a narrow beam. The broadcast beam is generally a wide beam covering a whole sector, and is used to transmit a control signal, a voice signal, and the like at a low data rate. The narrow beam is used to perform transmission at a high data rate. In the 2G to 4G mobile communications systems, an antenna is an omni-directional antenna or a directional antenna, and a fixed zero-filling wide coverage beam or a narrow beam moving in a sector is used.

For adapting to new requirements that mobile communication continuously raises for a data rate, a high frequency, high bandwidth, multiple antennas, and multi-cell division become a development trend of new-generation mobile communication.

Some prior art provides a multi-antenna beam coverage system applied to cellular communication and broadcasting. In this technology, a system antenna divides sectors according to 120 degrees, where three antenna beams exist in each sector. The three antenna beams include two broadcast beams (a multi-cell omni-directional coverage beam and a single-cell specific broadcast beam) and one narrow beam (a sectoral beam whose direction can be adjusted in a cell). In this technology, the system includes multiple antennas, a signal allocation network, and a control circuit. This technology uses a multi-carrier multi-antenna system, which is used to form the three antenna beams. Three antenna units include an omni-directional antenna, a directional wide beam antenna, and a narrow beam antenna with an adjustable directivity pattern, and the antenna units need to be independently designed according to different beam characteristics. The signal allocation network allocates multiple input signals to a corresponding antenna unit. In this technology, the narrow beam needs to scan in a whole sector, and multi-user same-type data shares one narrow beam, causing a service capacity of a communications system to be limited.

SUMMARY

Embodiments of the present disclosure provide a base station and a beam coverage method, which can improve a service capacity of a communications system.

According to a first aspect, a base station is provided, including: an antenna and at least two data transmission paths, where a data converter and a beamformer are disposed on each of the at least two data transmission paths. The antenna includes a beam aggregation structure and at least one antenna bay. The beam aggregation structure includes at least one antenna aperture. One beamformer is correspondingly connected to one antenna bay. One antenna bay uses at least one antenna aperture in the beam aggregation structure to receive and send a beam. A multiplexer is further disposed on the at least two data transmission paths.

In one embodiment, the data converter is configured to acquire a to-be-transmitted signal, to convert the to-be-transmitted signal into a first analog signal, and to send the first analog signal to the beamformer. In that embodiment, the beamformer is configured to use a first preset beam direction to perform beamforming on the first analog signal, and to transmit, by using the antenna bay, the first analog signal over at least one antenna aperture of the beam aggregation structure.

Alternative to the embodiment described above, in another embodiment, the beamformer is configured to receive, by using the antenna bay, a radiation signal in a second preset beam direction over at least one antenna aperture of the beam aggregation structure, to demodulate the radiation signal to acquire a second analog signal, and to send the second analog signal to the data converter. In that embodiment, the data converter is configured to convert the radiation signal into a first digital signal.

In some embodiments, the multiplexer is configured to set a data transmission path of the to-be-transmitted signal or the radiation signal.

With reference to the first aspect, in first implementations, the multiplexer can be disposed between the data converter and the beamformer on the at least two data transmission paths. In those implementations, setting the data transmission path of the to-be-transmitted signal or the radiation signal by the multiplexer can comprise: selecting a beamformer and a data converter to form the data transmission path of the to-be-transmitted signal or the radiation signal.

With reference to the first aspect, in second implementations, the multiplexer can be disposed on a side that is of the at least two data transmission paths and on which the data converter receives the to-be-transmitted signal or outputs the first digital signal. In those implementations, setting the data transmission path of the to-be-transmitted signal or the radiation signal by the multiplexer can comprise: selecting, as the data transmission path of the to-be-transmitted signal or the radiation signal, a data transmission path on which the data converter and the beamformer are disposed.

With reference to the first aspect or the first implementations, in one implementation, the base station further includes a beam controller. In that implementation, the beam controller is configured to estimate, according to the first preset beam direction or the second preset beam direction, a beam direction of a first area. The first area is adjacent to an area the first preset beam direction or the second preset beam direction belongs to. In that implementation, the beam controller is further configured to send the first control signal to the multiplexer for controlling adjustment of the data transmission path to another data transmission path, where the another data transmission path is a data transmission path on which the beam direction of the adjacent area is formed.

In some embodiments, the base station further includes a beam controller. In that implementation, the beam controller is configured to estimate, according to the first preset beam direction or the second preset beam direction, a beam direction of a first area. The first area is adjacent to an area the first preset beam direction or the second preset beam direction belongs to. In that implementation, if the adjacent area belongs to a cell controlled by another base station, the beam controller is further configured to send the first control signal to a multiplexer of the another base station, for controlling adjustment of a data transmission path of the another base station to a first data transmission path, where the first data transmission path is a data transmission path on which the beam direction of the adjacent area is formed.

With reference to any one of the first aspect, or any implementation mentioned above, in still another implementation, the antenna aperture is used for beam coverage of user terminal data transmission and beam coverage of inter-base station data backhaul.

In some embodiments, in yet another implementation, the multiplexer is a digital multiplexer or an analog multiplexer.

According to a second aspect, a beam coverage method is provided. The method includes: setting a data transmission path of a to-be-transmitted signal, converting the to-be-transmitted signal into a first analog signal on the data transmission path; and using a first preset beam direction to perform beamforming on the first analog signal, and transmitting, by using an antenna bay, the first analog signal over at least one antenna aperture of a beam aggregation structure.

With reference to the second aspect, in some embodiments, the method can further include estimating, according to the first preset beam direction of a first area. The first area is adjacent to an area the first preset beam direction or the second preset beam direction belongs to. In those embodiments, the method can further include generating a first control signal and adjusting the data transmission path of the to-be-transmitted signal to another data transmission path according to the first control signal, where the another data transmission path is a data transmission path on which the beam direction of the adjacent area is formed.

With reference to the second aspect, in some other embodiments, the method can further include: estimating, according to the first preset beam direction of transmission, a beam direction of a first area. The first area is adjacent to an area the first preset beam direction or the second preset beam direction belongs to. In those embodiments, the method can also include generating a first control signal. In those embodiments, if the adjacent area belongs to a cell controlled by another base station, the method can further include: sending the first control signal to the another base station, so that the another base station adjusts, according to the first control signal, a data transmission path used by the another base station to transmit the to-be-transmitted signal, to a first data transmission path, where the first data transmission path is a data transmission path on which the beam direction of the adjacent area is formed.

With reference to the second aspect or any possible implementation manner of the second aspect, in a third possible implementation manner, the antenna aperture is used for beam coverage of user terminal data transmission and beam coverage of inter-base station data backhaul.

According to a third aspect, a beam coverage method is provided. The method can include: setting a data transmission path of a received radiation signal; receiving, by using an antenna bay, a radiation signal in a second preset beam direction over at least one antenna aperture of a beam aggregation structure; demodulating the radiation signal on the data transmission path to acquire a second analog signal; and converting the second analog signal into a first digital signal on the data transmission path.

With reference to the third aspect, in some embodiments, the method can further include: estimating, according to the second preset beam direction, a beam direction of a third area. The third area is adjacent to an area the second preset beam direction belongs to. In those embodiments, the method can include generating a first control signal, and adjusting the data transmission path of the radiation signal to another data transmission path according to the first control signal, where the another data transmission path is a data transmission path on which the beam direction of the adjacent area is formed.

With reference to the third aspect, in some other embodiments, the method can further include: estimating, according to the second preset beam direction, a beam direction of a third area. The third area is adjacent to an area the second preset beam direction belongs to. In those embodiments, the method can also include generating a first control signal. In those embodiments, the method can further include, if the adjacent area belongs to a cell controlled by another base station, sending the first control signal to the another base station, so that the another base station adjusts, according to the first control signal, a data transmission path used by the another base station to receive the radiation signal to a first data transmission path, where the first data transmission path is a data transmission path on which the beam direction of the adjacent area is formed.

With reference to the third aspect or any implementation of the third aspect as mentioned above, in some embodiments, the antenna aperture is used for beam coverage of user terminal data transmission and beam coverage of inter-base station data backhaul.

According to the base station and the beam coverage method that are provided above, a data transmission path of a to-be-transmitted signal or a received radiation signal can be set according to the to-be-transmitted signal or the received radiation signal. In accordance with the disclosure, the base station can include at least two data transmission paths, beamforming can be independently performed for each data transmission path, and it is unnecessary to share one narrow beam for receiving and sending multi-user same-type data. In this way, a service capacity of a communications system can be improved. Further, because different single-user data can be allocated to different beams for receiving and sending, a transmission rate of the single-user data can be improved to some extent.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
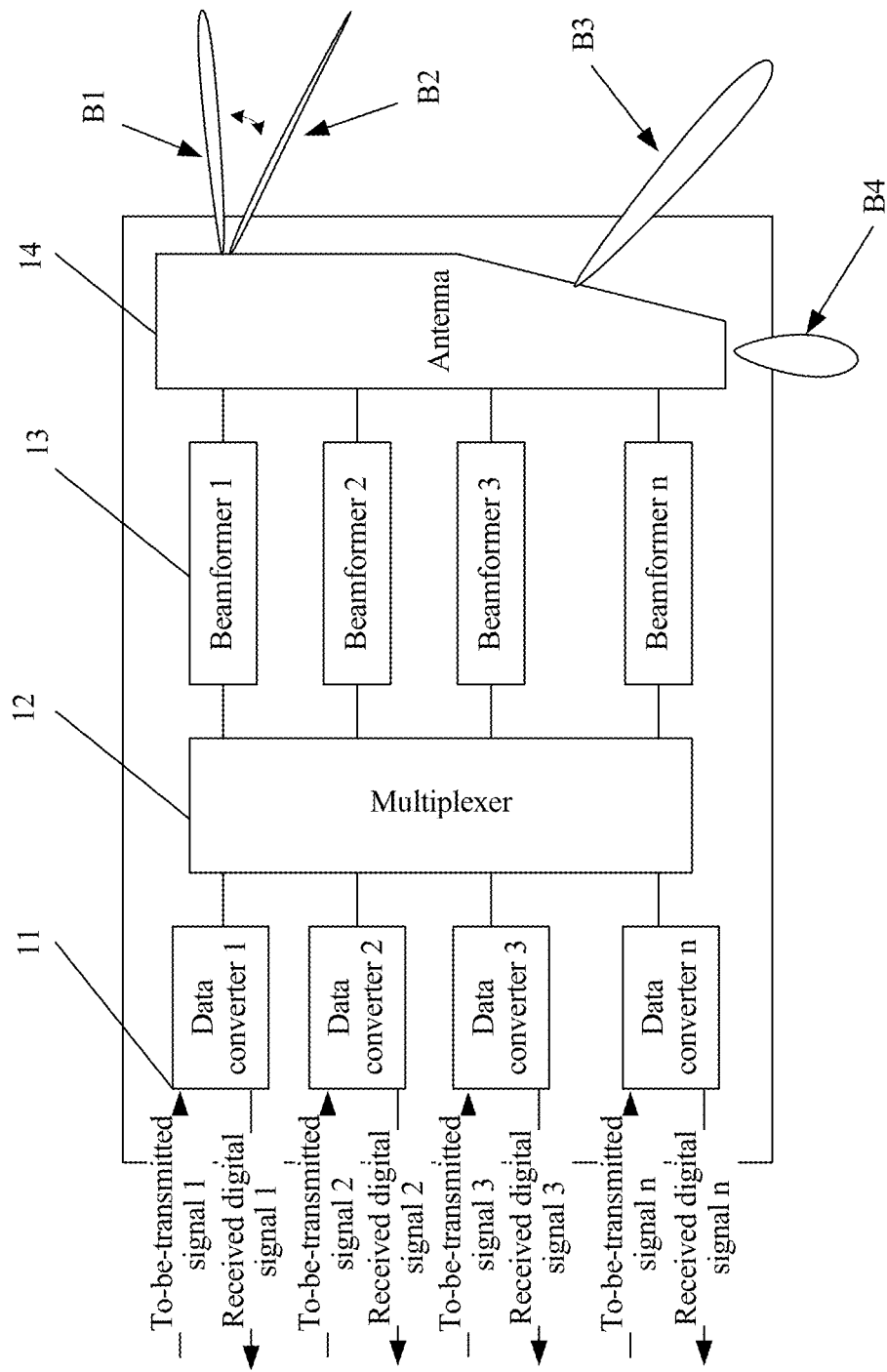
FIG. 1 is a schematic structural diagram of a base station according to an embodiment of the present disclosure.

Multiple embodiments are now described with reference to the accompanying drawings, and same components in this specification are indicated by a same reference numeral. In the following description, for ease of explanation, many specific details are provided to facilitate comprehensive understanding of one or more embodiments. However, apparently, the embodiments may not be implemented by using these specific details. In other examples, a well-known structure and device are shown in a form of a block diagram, to conveniently describe one or more embodiments.

A base station provided in the embodiments of the present disclosure may be a WiFi AP (Access Point), or a BTS (Base Transceiver Station) in GSM (Global System for Mobile Communications) or CDMA (Code Division Multiple Access); or may be an NB (NodeB) in WCDMA (Wideband Code Division Multiple Access); or may be an eNB or eNodeB (evolved NodeB) in LTE (Long Term Evolution), a relay station or an access point, a base station device in a future 5G network, or the like.

Figure 2:
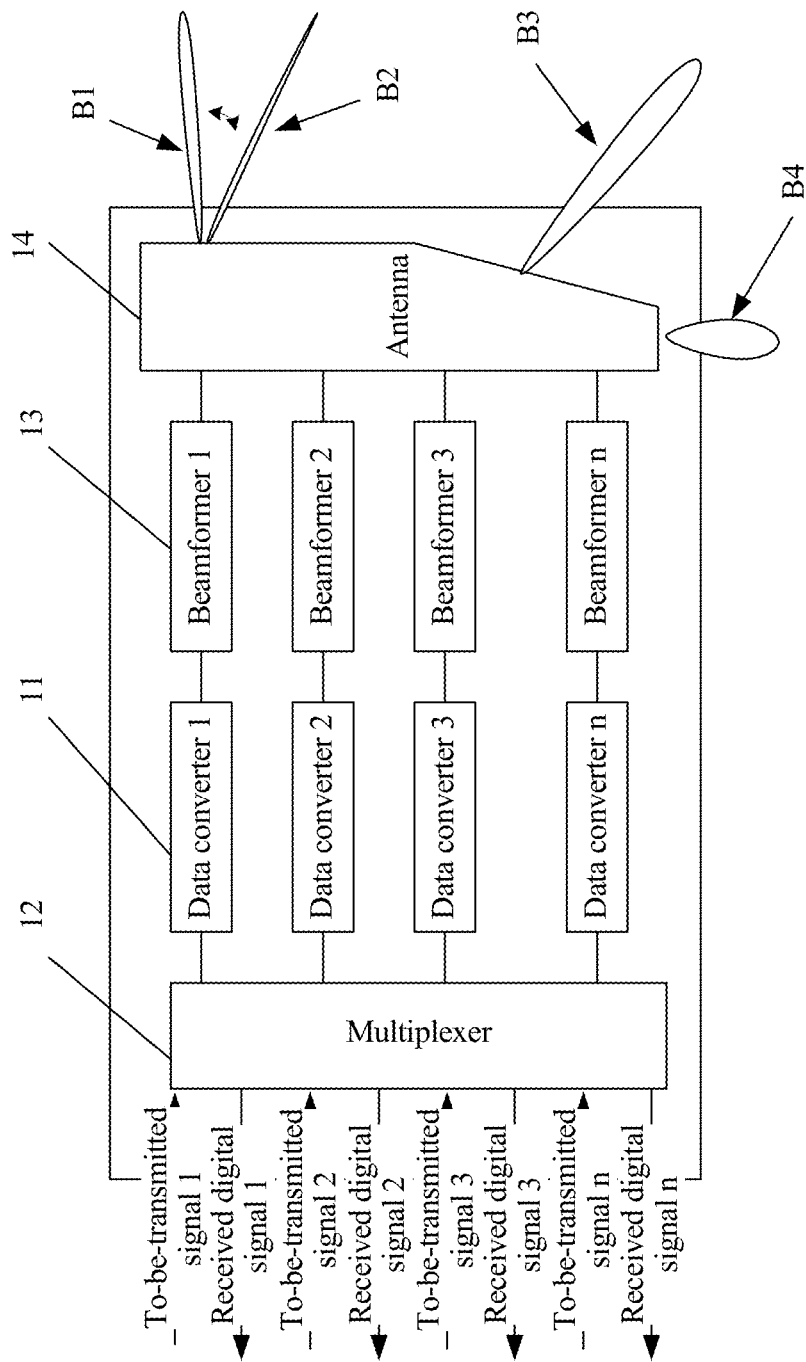
FIG. 2 is a schematic structural diagram of a base station according to an embodiment of the present disclosure.
Figure 3:
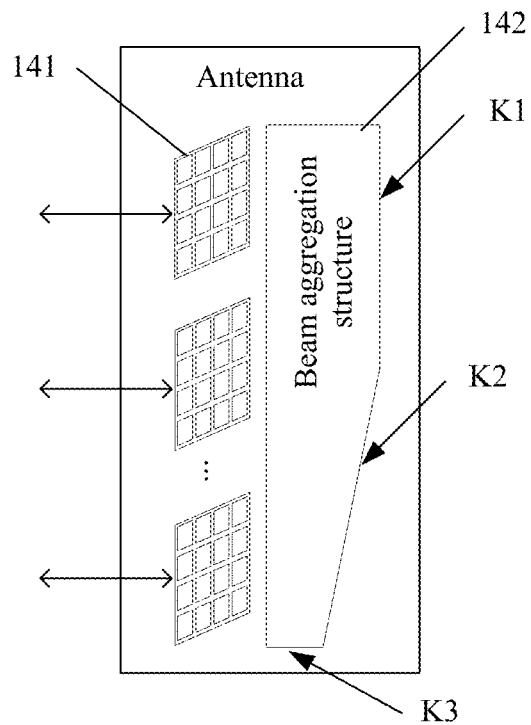
FIG. 3 is a schematic structural diagram of an antenna according to an embodiment of the present disclosure.

As shown in FIG. 1, and FIG. 2 a base station in accordance with the present disclosure can include an antenna 14 and at least two data transmission paths, where a data converter 11 and a beamformer 13 are disposed on each data transmission path. FIG. 3 illustrates a specific embodiment of the base station shown in FIG. 1 and FIG. 2. As shown in FIG. 3, the antenna 14 shown in FIG. 1 and FIG. 2 can include a beam aggregation structure 142 and at least one antenna bay 141. The beam aggregation structure 142 can include at least one antenna aperture. An individual beamformer 13 shown in FIG. 1 and FIG. 2 can be connected to a corresponding antenna bay 141 shown in FIG. 3. An individual antenna bay 141 can use at least one antenna aperture of the beam aggregation structure 142 to receive and send a beam as shown in FIG. 3. As shown in FIGS. 1 and 2, a multiplexer 12 is further disposed on the at least two data transmission paths.

When the base station transmits a signal, the data converter 11 is configured to acquire a to-be-transmitted signal, convert the to-be-transmitted signal into a first analog signal, and send the first analog signal to the beamformer 13; and the beamformer 13 is configured to use a first preset beam direction to perform beamforming on the first analog signal, and transmit, by using the antenna bay 141, the first analog signal over at least one antenna aperture of the beam aggregation structure 142.

When the base station receives a signal, the beamformer 13 is configured to receive, by using the antenna bay 141, a radiation signal in a second preset beam direction over at least one antenna aperture of the beam aggregation structure 142, demodulate the radiation signal to acquire a second analog signal, and send the second analog signal to the data converter 11; and the data converter 11 is configured to convert the radiation signal into a first digital signal.

The multiplexer 12 is configured to set a data transmission path of the to-be-transmitted signal or the radiation signal.

In some embodiments, as shown in FIG. 1, the multiplexer 12 is disposed between the data converter 11 and the beamformer 13 on the at least two data transmission paths; and that the multiplexer 12 is configured to set a data transmission path of the to-be-transmitted signal or the radiation signal by selecting a specific beamformer 13 and a specific data converter 11 corresponding to the specific beamformer 13, as the beamformer 13 and the data converter 11 on the data transmission path of the to-be-transmitted signal or the radiation signal.

The following describes a specific structure of the base station with reference to FIG. 1. The following embodiment gives a description by using an example in which a to-be-transmitted signal is downlink data on a data transmission path and a radiation signal is uplink data on a data transmission path.

A data converter 11 (1-$n$, as shown in FIG. 1 or FIG. 2) is connected to the multiplexer 12, the multiplexer 12 is connected to a beamformer 13 (1-$n$, as shown in FIG. 1 or FIG. 2), and the beamformer 13 (1-$n$, as shown in FIG. 1 or FIG. 2) is connected to one antenna bay 141 of the antenna 14.

The data converter 11 (1-$n$, as shown in FIG. 1 or FIG. 2) may be a structure that has a DA/AD conversion function, where the data converter is a two-way component and includes two ports. When a first port is used for input, a second port is used for output; when the second port is used for input, the first port is used for output. In an example, when a to-be-transmitted signal 1 is input into a first port of a data converter 1, the to-be-transmitted signal 1 can be converted into an analog signal (that is, a first analog signal) by using a DAC digital-to-analog converter and output through a second port. Still in that example, when the second port receives an analog signal (that is, a second analog signal) sent by the multiplexer, the analog signal can be converted into a digital signal (that is, a first digital signal) by using an ADC analog-to-digital converter and output through the first port. The data converter (1-$n$) mainly completes analog-to-digital or digital-to-analog conversion of user data. Both the to-be-transmitted signal and the first digital signal are baseband digital signals. Exemplarily, the user data herein may be single-user data or multi-user data.

Figure 4:
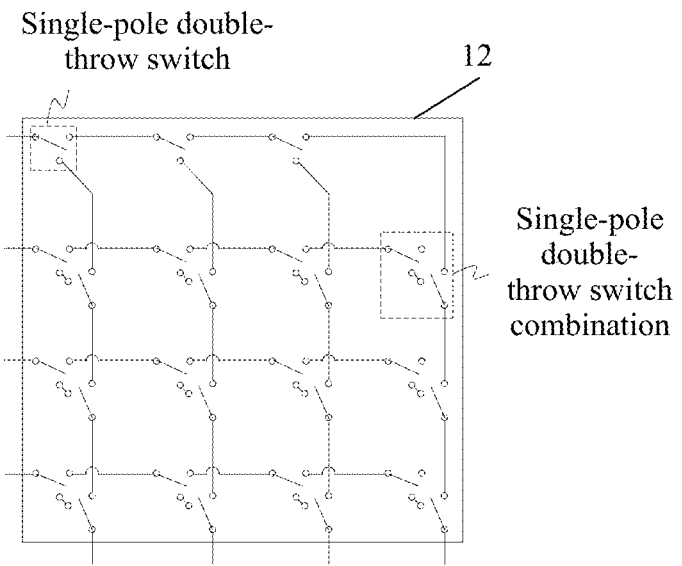
FIG. 4 is a schematic structural diagram of a multiplexer according to an embodiment of the present disclosure.

In some embodiments, the multiplexer 12 is a digital multiplexer or an analog multiplexer. In the base station shown in FIG. 1, the multiplexer 12 is located in an analog signal domain between a data converter 11 and a beamformer 13. In this case, the multiplexer 12 is an analog multiplexer. Specifically, the multiplexer 12 may include a switch matrix. As shown in FIG. 4, the multiplexer 12 can include a two-way component. As shown in FIG. 4, a left side of the multiplexer 12 can include N ports, and a right side of the multiplexer 12 can include N ports, where any port of the N ports on the left side may be used as an input end or an output end, and any port of the N ports on the right side may be used as an input end or an output end. When any port on the left side is used for input, an input signal may be controlled, according to a control signal, to be output through any port on the right side. Likewise, when any port on the right side is used for input, an input signal may be controlled, according to a control signal, to be output through any port on the left side. As shown in FIG. 4, the multiplexer 12 may be a single-pole double-throw switch array, or when an apparatus requires relatively few data transmission paths, a single-pole multi-throw switch array shown in FIG. 5 or a single-pole single-throw switch array shown in FIG. 6 may be used. The multiplexers shown in FIG. 4, FIG. 5, and FIG. 6 of the foregoing embodiments are all examples for four-way input and four-way output. It should be understood that the present disclosure is not limited to the foregoing forms, and other multiplexers that can implement the foregoing function are all applicable.

The beamformer 13 (1-*n*, shown in FIG. 1 or FIG. 2) can include two transmission channels: a receive channel (an uplink data channel) and a transmit channel (a downlink data channel). In an example, the transmit channel of the beamformer 13 (1-*n*) is configured to receive a first analog signal, use a first preset beam direction to perform beamforming on the first analog signal, and send the first analog signal to a connected antenna bay for transmitting; or the receive channel of the beamformer 13 (1-*n*) receives, by using an antenna bay 141, a radiation signal in a second preset beam direction, demodulates the radiation signal to acquire a second analog signal, and sends the second analog signal to a data converter 11. According to the prior art, the beamformer 13 (1-*n*) specifically includes: a front-end circuit channel and an independent antenna feed of each channel. Further, the front-end circuit channel specifically includes an up- or down-frequency conversion circuit, an amplification circuit, a filter circuit, and a phase shift or delay circuit. It may be understood that the up-frequency conversion circuit is used for the transmit channel, the down-frequency conversion circuit is used for the receive channel, and the front-end circuit channel is configured to convert a downlink data analog signal (that is, a first analog signal) into a modulated signal of a corresponding frequency, or demodulate an uplink data modulated signal (that is, a radiation signal) into a baseband or intermediate frequency analog signal (that is, a second analog signal). The phase shift or delay circuit in the front-end circuit channel is implemented by an adjustable analog component, which can control, by means of voltage adjustment or digital adjustment, a beam directivity pattern of feed-in and feed-out of an antenna bay corresponding to each front-end circuit channel. The antenna feed and the antenna bay 141 of the antenna are configured to feed in and feed out each data stream according to a required beam direction and a required beam angle.

As shown in FIG. 3, the antenna 14 can include the beam aggregation structure 142 and at least one antenna bay 141, where the beam aggregation structure 142 includes at least one antenna aperture (three antenna apertures K1, K2, and K3 in a vertical direction are exemplarily shown in the figure), the antenna aperture refers to a shape and a size of the beam aggregation structure 142, and the beam aggregation structure 142 is located in the periphery of the antenna bay 141. The beam aggregation structure 142 in the example shown in FIG. 3 includes a beam aggregation function, which can be used to aggregate a beam transmitted by the antenna bay 141. Each antenna bay 141 may use at least one antenna aperture. In the prior art, one antenna bay generally transmits or receives a beam by using only one antenna aperture. Because the beam aggregation structure 142 has the beam aggregation function, preferably, multiple antenna bays 141 may share one antenna aperture in some embodiments. A design of the antenna aperture of the beam aggregation structure 142 may need to meet a requirement that beams transmitted by the foregoing multiple antenna bays 141 can be fed out according to a required direction. Further, the antenna aperture is used for beam coverage of user terminal data transmission and beam coverage of inter-base station data backhaul.

Figure 7:
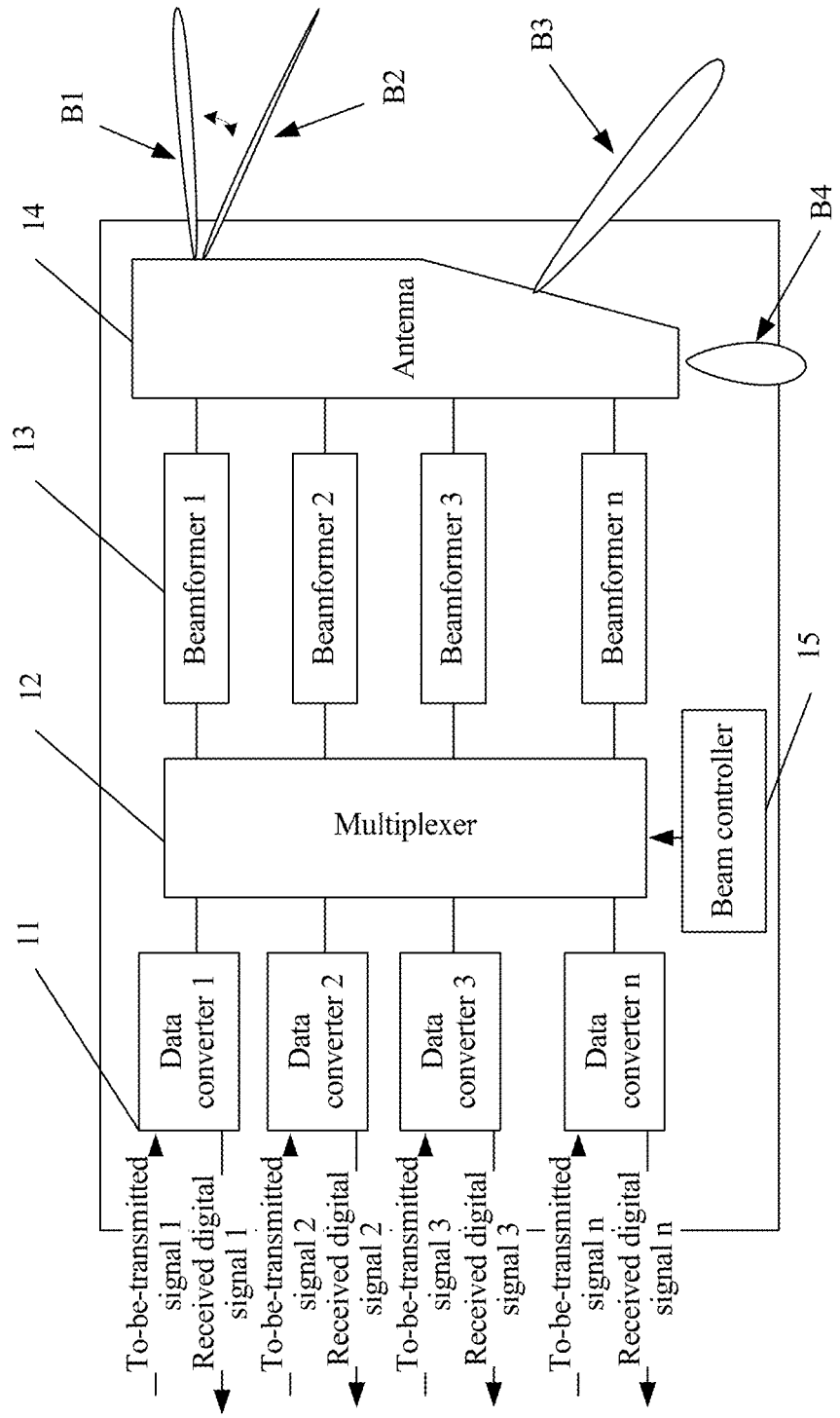
FIG. 7 is a schematic structural diagram of a base station according to an embodiment of the present disclosure.
Figure 8:
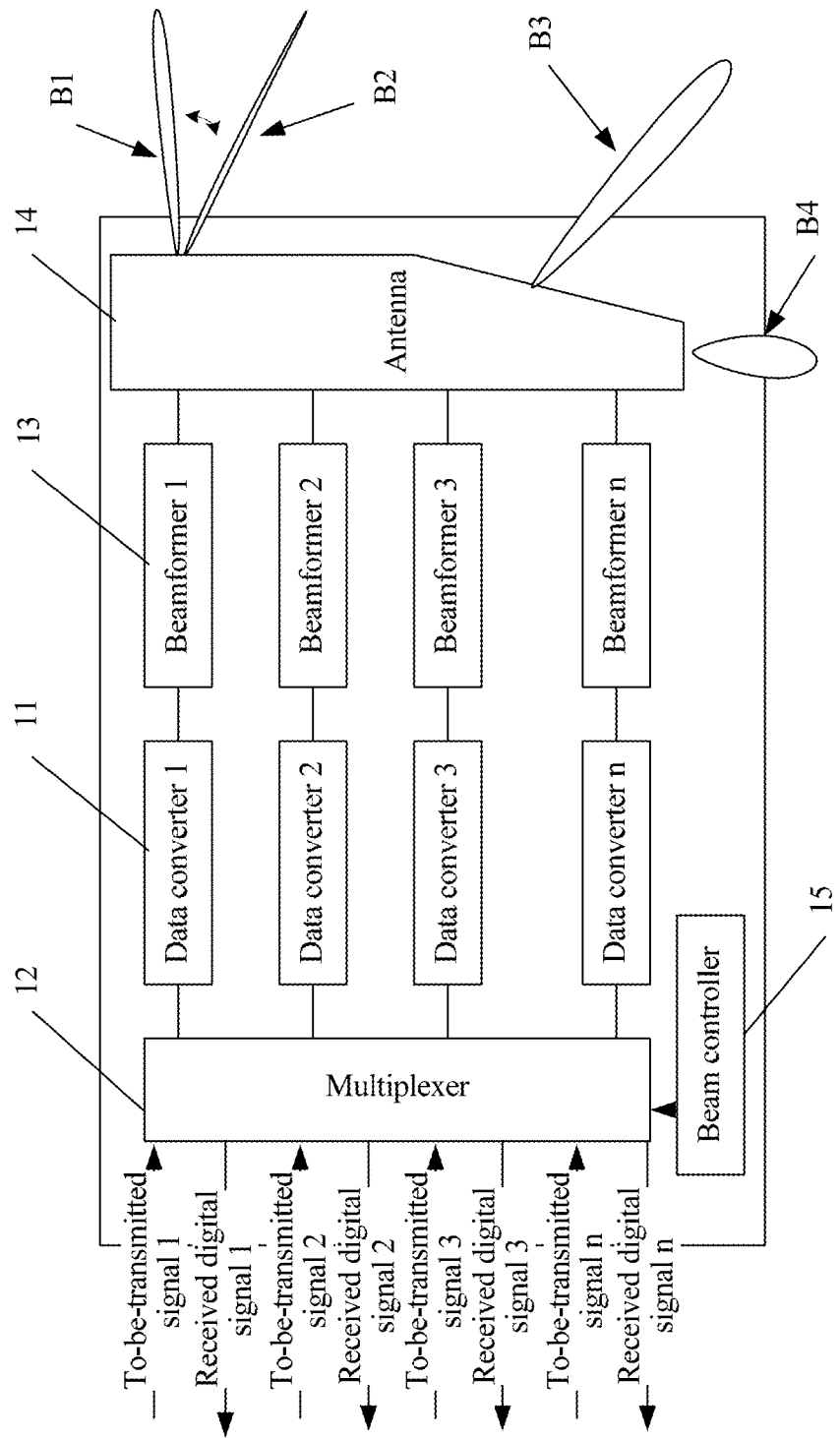
FIG. 8 is a schematic structural diagram of a base station according to an embodiment of the present disclosure.

Further, as shown in FIG. 7 or FIG. 8, the base station can further include a beam controller 15, which can be configured to estimate, according to the first preset beam direction or the second preset beam direction, a beam direction of a first area adjacent to an area to which the first preset beam direction or the second preset beam direction belongs, and generate a first control signal; and send the first control signal to the multiplexer 12, so as to control adjustment of the data transmission path to another data transmission path, where the another data transmission path is a data transmission path on which the beam direction of the first area is formed.

Specifically, in the prior art, when a system processes a to-be-transmitted signal received by the data converter 11 or a received digital signal generated by the data converter 11, beam direction information can be acquired. Specifically, the beam controller 15 can be configured to estimate, according to a beam direction of transmitting the first analog signal or receiving the radiation signal, the beam direction of the first area adjacent to the area to which the first preset beam direction or the second preset beam direction belongs by estimating, according to information about the first preset beam direction or the second preset beam direction and acquired in a baseband processing process, the beam direction of the first area adjacent to the area to which the first preset beam direction or the second preset beam direction belongs. This feature can implement switching that is between different areas and of a beam of a same base station.

In some embodiments, the base station can further include a beam controller 15, which is configured to estimate, according to the first preset beam direction or the second preset beam direction, a beam direction of the first area adjacent to the area to which the first preset beam direction or the second preset beam direction belongs, and generate a first control signal. In those embodiments, if the first area belongs to a cell controlled by another base station, the beam controller 15 can be further configured to send the first control signal to a multiplexer of the that base station, for that base station to control adjustment of a data transmission path of the that base station to a first data transmission path, where the first data transmission path is a data transmission path on which the beam direction of the first area is formed. This feature can implement switching that is between different areas and of beams that belong to different base stations. The foregoing two types of switching can implement beam coverage of different areas to which a user moves.

Figure 9:
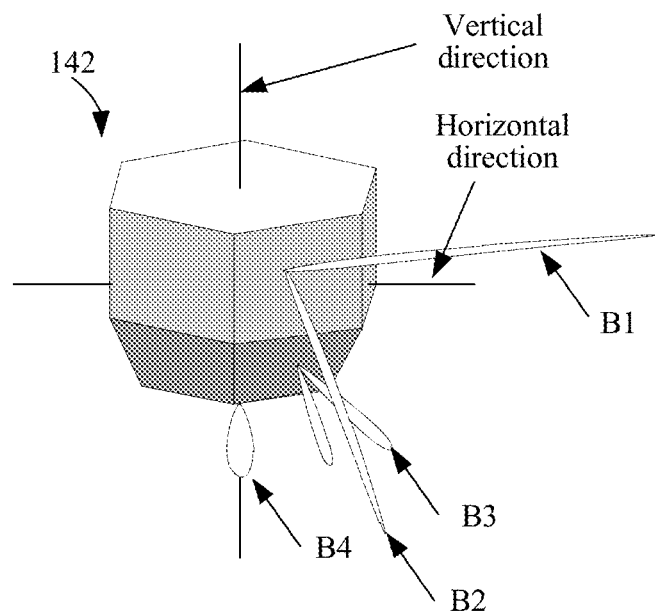
FIG. 9 is a schematic structural diagram of a beam aggregation structure according to an embodiment of the present disclosure.
Figure 10:
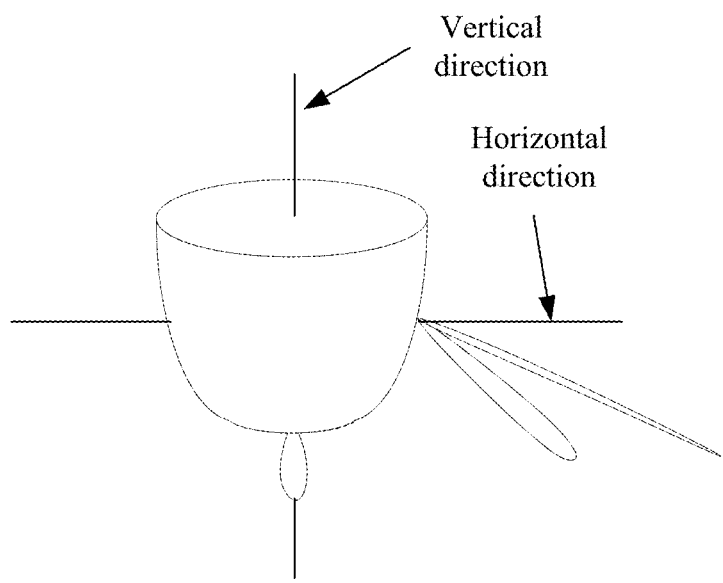
FIG. 10 is a schematic structural diagram of a beam aggregation structure according to an embodiment of the present disclosure.

As shown in FIG. 9, an embodiment of the present disclosure provides one example of a beam aggregation structure 142 shown in FIG. 3. In this example, the beam aggregation structure 142 includes six planes in a horizontal direction, includes two antenna apertures of a vertical plane and an inclined plane in a vertical direction, and further includes an antenna aperture that is solely horizontal-downward in the vertical direction. With reference to the embodiment shown in FIG. 1 or FIG. 2, the beam coverage of user terminal data transmission is based on an outer-loop beam B2, a second-loop beam B3, and an inner-loop beam B4, and the beam coverage of inter-base station data backhaul is based on a backhaul beam B1. It should be understood that an antenna aperture of any other form may be used. As shown in FIG. 10, a shape of an antenna aperture can include a curved surface. All beams in a same vertical direction can share one antenna aperture. There is an independent horizontal-downward antenna aperture, which is configured to radiate downward and receive a beam. Beam distribution formed by the foregoing antenna aperture meets the following criteria: an area corresponding to any beam is greater than a 3 dB beamwidth of any beam in the area, and less than a maximum scanning angle of any beam in the area. An area corresponding to each beam includes at least one beam. According to the prior art, a beamformer may perform beamforming by using a phase shift or delay circuit in a front-end circuit, so as to adjust a shape of a single beam formed by the beamformer in an area range, thereby implementing beam scanning in the area range.

Figure 11:
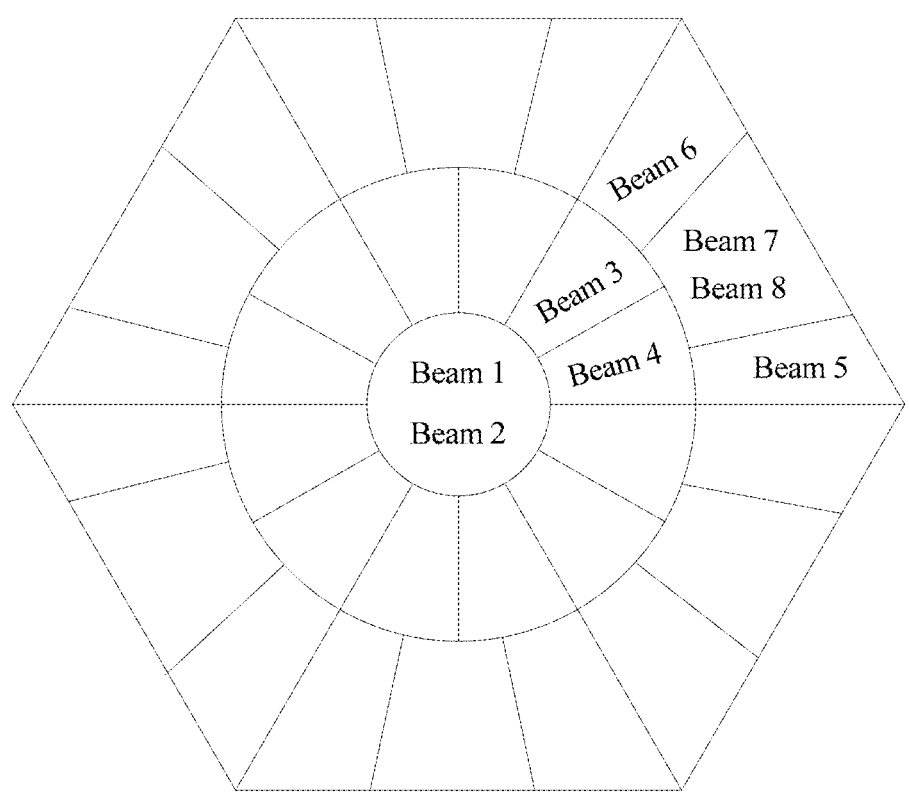
FIG. 11 is a schematic diagram of beam distribution according to an embodiment of the present disclosure.

Specifically, as shown in FIG. 11, a schematic diagram of beam distribution in a horizontal direction is provided. Specifically, each beam only covers a partial area of a whole cell covered by a base station, where a definition of the partial area is: the whole cell covered by the base station is divided into one or more annular areas in a radius direction (exemplarily, an optional manner is provided: as shown in FIG. 11, three annular areas are used as an example, where a quantity of annular areas depends on a quantity of antenna apertures of the beam aggregation structure 142 in the vertical direction; specifically, referring to FIG. 8, three apertures are included in this example: an aperture at which the beam B4 is located, an aperture at which the beam B3 is located, and an antenna aperture at which B1 and B2 are located. It should be understood, this is only an example, another division manner may be used); and each annular area is further divided into one or more partial areas (as shown in FIG. 11, a beam 3 and a beam 4 are located in a same annular area but different partial areas). An included angle between each partial area and a base station antenna meets the following criteria: being greater than a 3 dB beamwidth of any beam in the partial area, and less than an allowed maximum scanning angle of any beam in the partial area. Each partial area is covered by one or more independent beams, which depends on user quantity distribution and user data capacity distribution of each partial area in a current cell. Dynamic resource configuration can be implemented by using a beamformer to adjust a partial area location formed in a whole cell and a quantity of beams in the partial area location. Transmission path control by a multiplexer enables each beam to be formed by one or more independent beamformers. Each beam scans in one partial area, and the partial area and an adjacent partial area in which user equipment uses the beam are tracked and recorded. In addition, a scanning range of each beam may include the adjacent partial area, that is, the scanning range of the beam has a coincident range in the adjacent area of the partial area, so as to ensure a seamless connection in the whole cell covered by the base station.

The foregoing embodiments give descriptions by using an example in which the multiplexer is located in an analog signal domain, and specifically located between a data converter and a beamformer. In some embodiments, as shown in FIG. 2, the multiplexer 12 is disposed on a side that is of the at least two data transmission paths and on which the data converter 11 receives the to-be-transmitted signal or outputs the first digital signal; and that the multiplexer 12 is configured to set a data transmission path of the to-be-transmitted signal or the radiation signal by selecting, as the data transmission path of the to-be-transmitted signal or the radiation signal, a data transmission path on which the data converter 11 and the beamformer 13 are disposed. That is, the multiplexer 12 can be located in a baseband digital signal domain. In this case, the multiplexer 12 is a digital multiplexer, where the digital multiplexer may include functional hardware that is implemented based on software control, for example, a circuit structure in a form such as a single-chip microcomputer or a processor that can implement a multiplexer function. A specific implementation manner is not described for the sake of clarity. For a function of each component in the embodiment shown in FIG. 2, refer to the description of the foregoing embodiments.

According to the base station provided above, a data transmission path of a to-be-transmitted signal or a received radiation signal can be set according to the to-be-transmitted signal or the received radiation signal. In accordance with the present disclosure, the base station can include at least two data transmission paths, beamforming can be independently performed for each data transmission path, and it is unnecessary to share one narrow beam for receiving and sending multi-user same-type data. In this way, a service capacity of a communications system can be improved. Further, because different single-user data can be allocated to different beams for receiving and sending, a transmission rate of the single-user data can be improved to some extent.

Figure 12:
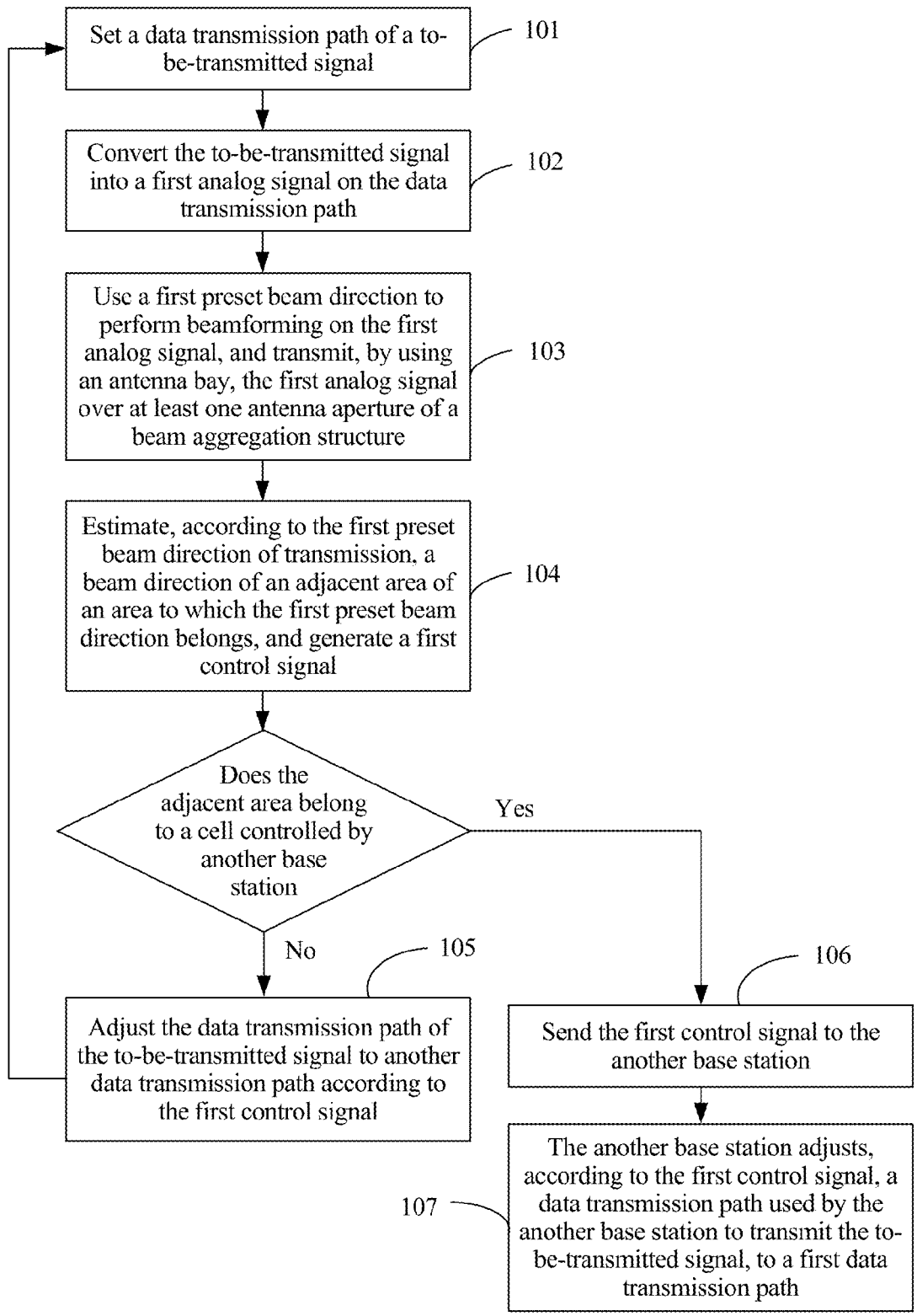
FIG. 12 is a schematic flowchart of a beam coverage method according to an embodiment of the present disclosure.

An embodiment of the present disclosure further provides a beam coverage method, which can be implemented by the foregoing base station. For downlink data, as shown in FIG. 12, the beam coverage method can include the following steps:

At 101, a data transmission path of a to-be-transmitted signal can be set.

At 102, the to-be-transmitted signal can be converted into a first analog signal on the data transmission path.

At 103, a first preset beam direction can be used to perform beamforming on the first analog signal, and to transmit, by using an antenna bay, the first analog signal over at least one antenna aperture of a beam aggregation structure.

In some embodiments, the beam coverage method can further provide a switching manner of the data transmission path by including the following steps:

At 104, according to the first preset beam direction of transmission, a beam direction of a first area adjacent to an area to which the first preset beam direction belongs can be estimated, and a first control signal can be generated.

At 105, the data transmission path of the to-be-transmitted signal can be adjusted to another data transmission path according to the first control signal.

In step 105, the another data transmission path is a data transmission path on which the beam direction of the first area is formed. Specifically, if the first area belongs to a cell controlled by another base station, the method can further include the following steps:

At 106, the first control signal can be sent to the another base station, where it can be learned from the foregoing apparatus embodiment that in step 106, the base station sends the first control signal on a backhaul beam (the beam B1 in FIG. 1 or FIG. 2) for communication with the another base station.

At 107, according to the first control signal, a data transmission path used by the another base station to transmit the to-be-transmitted signal, to a first data transmission path can be adjusted at the another base station.

In step 107, the first data transmission path is a data transmission path on which the beam direction of the first area is formed.

In some embodiments, an area corresponding to each beam is greater than a 3 dB beamwidth of any beam in the area, and less than a maximum scanning angle of any beam in the area. The area corresponding to each beam includes at least one beam. The antenna aperture is used for beam coverage of user terminal data transmission and beam coverage of inter-base station data backhaul.

Figure 5:
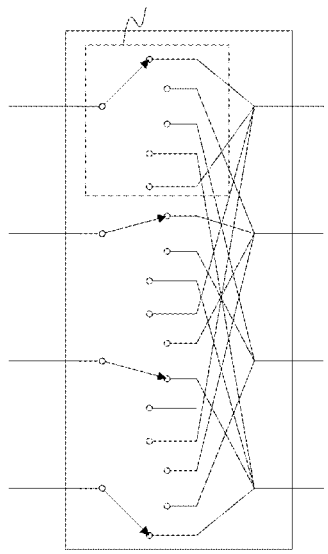
FIG. 5 is a schematic structural diagram of a multiplexer according to an embodiment of the present disclosure.
Figure 6:
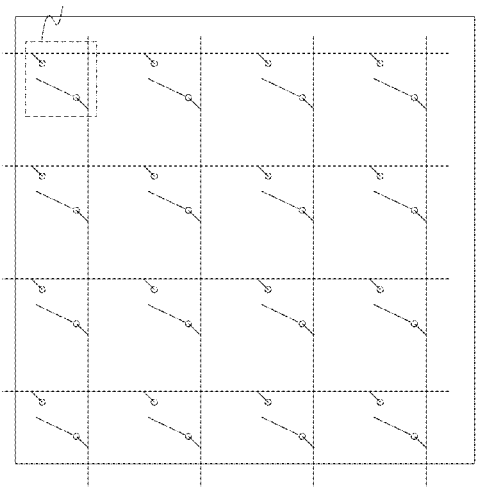
FIG. 6 is a schematic structural diagram of a multiplexer according to an embodiment of the present disclosure.
Figure 13:
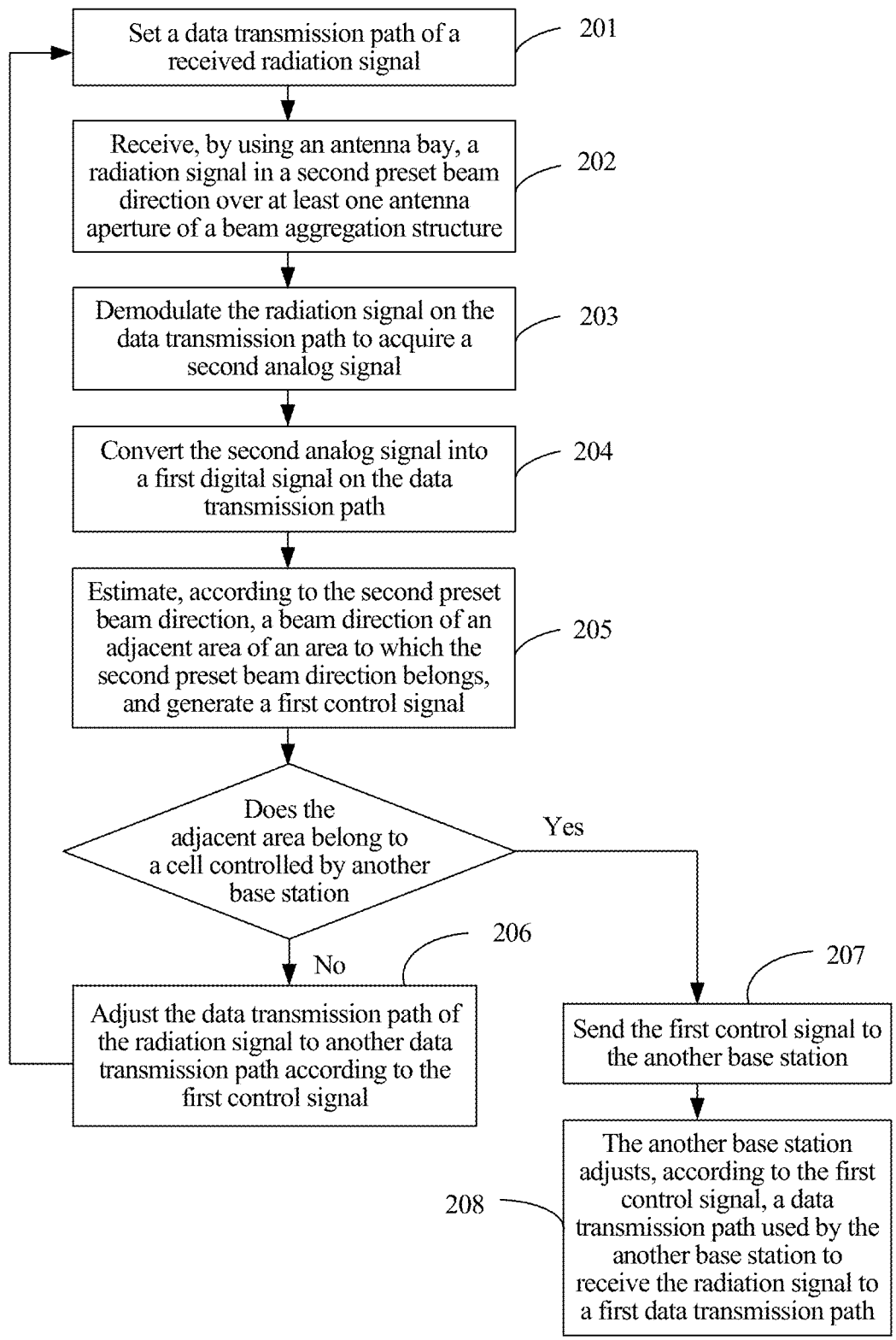
FIG. 13 is a schematic flowchart of a beam coverage method according to an embodiment of the present disclosure.

An embodiment of the present disclosure can further provide a beam coverage method, which is implemented by the foregoing base station. For uplink data, as shown in FIG. 5 13, the beam coverage method specifically includes the following steps:

At 201, a data transmission path of a received radiation signal can be set.

At 202, by using an antenna bay, a radiation signal in a second preset beam direction can be received over at least one antenna aperture of a beam aggregation structure.

At 203, the radiation signal on the data transmission path can be demodulated to acquire a second analog signal.

At 204, the second analog signal can be converted into a first digital signal on the data transmission path.

In some embodiments, the present disclosure can further provide a switching manner of the data transmission path by including the following steps:

At 205, according to the second preset beam direction, a beam direction of a second area adjacent to an area to which the second preset beam direction belongs, and a first control signal can be generated.

At 206, the data transmission path of the radiation signal to another data transmission path can be adjusted according to the first control signal.

In step 206, the another data transmission path is a data transmission path on which the beam direction of the second area is formed.

In some embodiments, if the second area belongs to a cell controlled by another base station, the method can further include the following steps:

At 207, the first control signal can be sent to the another base station, where it can be learned from the foregoing apparatus embodiment that in step 207, the base station sends the first control signal on a backhaul beam (the beam B1 in FIG. 1 or FIG. 2) for communication with the another base station.

At 208, according to the first control signal, a data transmission path used by the another base station to receive the radiation signal to a first data transmission path can be adjusted at the another base station.

In step 208, the first data transmission path is a data transmission path on which the beam direction of the second area is formed.

In some embodiments, an area corresponding to each beam is greater than a 3 dB beamwidth of any beam in the area, and less than a maximum scanning angle of any beam in the area. The area corresponding to each beam includes at least one beam. The antenna aperture is used for beam coverage of user terminal data transmission and beam coverage of inter-base station data backhaul.

According to the beam coverage method provided above, a data transmission path of a to-be-transmitted signal or a received radiation signal can be set according to the to-be-transmitted signal or the received radiation signal. In accordance with the disclosure, the base station can include at least two data transmission paths, beamforming can be independently performed for each data transmission path, and it is unnecessary to share one narrow beam for receiving and sending multi-user same-type data. In this way, a service capacity of a communications system can be improved. Further, because different single-user data can be allocated to different beams for receiving and sending, a transmission rate of the single-user data can be improved to some extent.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A base station, comprising:
    an antenna, wherein the antenna comprises a beam aggregation structure and at least one antenna bay, wherein the beam aggregation structure comprises at least one antenna aperture, one beamformer is correspondingly connected to each of the at least one antenna bay, and each of the at least one antenna bay uses at least one antenna aperture in the beam aggregation structure to receive and send a beam; and
    at least two data transmission paths, wherein a data converter and a beamformer are disposed on each of the at least two data transmission paths, and a multiplexer is further disposed on the at least two data transmission paths; and, wherein
    the data converter is configured to acquire a to-be-transmitted signal, to convert the to-be-transmitted signal into a first analog signal, and to send the first analog signal to the beamformer;
    the beamformer is configured to use a first preset beam direction to perform beam-forming on the first analog signal, and to transmit, by using the at least one antenna bay, the first analog signal over at least one antenna aperture of the beam aggregation structure; and
    the multiplexer is configured to set a data transmission path of the to-be-transmitted signal.

2. The base station according to claim 1, wherein the multiplexer is disposed between the data converter and the beamformer on the at least two data transmission paths; and
    setting the data transmission path of the to-be-transmitted signal by the multiplexer comprises:
    selecting a beamformer and a data converter to form the data transmission path of the to-be-transmitted signal; or, wherein
    the multiplexer is disposed on a side that is of the at least two data transmission paths and on which the data converter receives the to-be-transmitted signal; and
    setting the data transmission path of the to-be-transmitted signal by the multiplexer comprises:
    selecting, as the data transmission path of the to-be-transmitted signal, a data transmission path on which the data converter and the beamformer are disposed.

3. The base station according to claim 2, wherein the base station further comprises a beam controller configured to
    estimate, according to the first preset beam direction, a beam direction of a first area, the first area being adjacent to an area the first preset beam direction belongs to;
    generate a first control signal; and
    send the first control signal to the multiplexer for controlling adjustment of the data transmission path to another data transmission path, wherein the another data transmission path is a data transmission path on which the beam direction of the first area is formed.

4. The base station according to claim 2, wherein the base station further comprises a beam controller configured to
    estimate, according to the first preset beam direction, a beam direction of a first area, the first area being adjacent to an area the first preset beam direction belongs to; and generate a first control signal; and, wherein
if the first area belongs to a cell controlled by another base station, the beam controller is further configured to send the first control signal to a multiplexer of the another base station for controlling adjustment of a data transmission path of the another base station to a first data transmission path, wherein the first data transmission path is a data transmission path on which the beam direction of the first area is formed.

5. The base station according to claim 1, wherein the base station further comprises a beam controller configured to
estimate, according to the first preset beam direction, a beam direction of a first area, the first area being adjacent to an area the first preset beam direction belongs to;
generate a first control signal; and
send the first control signal to the multiplexer for controlling adjustment of the data transmission path to another data transmission path, wherein the another data transmission path is a data transmission path on which the beam direction of the first area is formed.

6. The base station according to claim 1, wherein the base station further comprises a beam controller configured to
estimate, according to the first preset beam direction, a beam direction of a first area, the first area being adjacent to an area the first preset beam direction belongs to; and
generate a first control signal; and, wherein
if the first area belongs to a cell controlled by another base station, the beam controller is further configured to send the first control signal to a multiplexer of the another base station for controlling adjustment of a data transmission path of the another base station to a first data transmission path, wherein the first data transmission path is a data transmission path on which the beam direction of the first area is formed.

7. The base station according to claim 1, wherein the antenna aperture is used for beam coverage of user terminal data transmission and beam coverage of inter-base station data backhaul.

8. The base station according to claim 1, wherein the multiplexer is a digital multiplexer or an analog multiplexer.

9. A beam coverage method, comprising:
setting a data transmission path of a to-be-transmitted signal;
converting the to-be-transmitted signal into a first analog signal on the data transmission path;
using a first preset beam direction to perform beamforming on the first analog signal; and
transmitting, by using an antenna bay, the first analog signal over at least one antenna aperture of a beam aggregation structure, wherein the antenna aperture is used for beam coverage of user terminal data transmission and beam coverage of inter-base station data backhaul.

10. The method according to claim 9, wherein the method further comprises:
estimating, according to the first preset beam direction, a beam direction of a first area, the first area being adjacent to an area the first preset beam direction belongs to;
generating a first control signal; and
adjusting the data transmission path of the to-be-transmitted signal to another data transmission path according to the first control signal, wherein the another data transmission path is a data transmission path on which the beam direction of the first area is formed.

11. The method according to claim 9, wherein the method further comprises:
estimating, according to the first preset beam direction of transmission, a beam direction of a first area, the first area being adjacent to an area the first preset beam direction belongs to; and
generating a first control signal; and, wherein
if the first area belongs to a cell controlled by another base station, the method further comprises:
sending the first control signal to the another base station for another base station to adjust, according to the first control signal, a data transmission path used by the another base station to transmit the to-be-transmitted signal, to a first data transmission path, wherein the first data transmission path is a data transmission path on which the beam direction of the first area is formed.

12. A beam coverage method, comprising:
setting a data transmission path of a received radiation signal;
receiving, by using an antenna bay, a radiation signal in a second preset beam direction over at least one antenna aperture of a beam aggregation structure;
demodulating the radiation signal on the data transmission path to acquire a second analog signal; and
converting the second analog signal into a first digital signal on the data transmission path.

13. The method according to claim 12, wherein the method further comprises:
estimating, according to the second preset beam direction, a beam direction of a second area, the second area being adjacent to an area the second preset beam direction belongs to;
generating a first control signal; and
adjusting the data transmission path of the radiation signal to another data transmission path according to the first control signal, wherein the another data transmission path is a data transmission path on which the beam direction of the second area is formed.

14. The method according to claim 12, wherein the method further comprises:
estimating, according to the second preset beam direction, a beam direction of a second area, the second area being adjacent to an area the second preset beam direction belongs to; and
generating a first control signal; and, wherein
if the second area belongs to a cell controlled by another base station, the method further comprises:
sending the first control signal to the another base station for the another base station to adjust, according to the first control signal, a data transmission path used by the another base station to receive the radiation signal to a first data transmission path, wherein the first data transmission path is a data transmission path on which the beam direction of the second area is formed.

15. The method according to claim 12, wherein the antenna aperture is used for beam coverage of user terminal data transmission and beam coverage of inter-base station data backhaul.

16. A base station, comprising:
an antenna, wherein the antenna comprises a beam aggregation structure and at least one antenna bay, wherein the beam aggregation structure comprises at least one antenna aperture, one beamformer is correspondingly connected to each of the at least one antenna bay, and each of the at least one antenna bay uses at least one antenna aperture in the beam aggregation structure to receive and send a beam; and at least two data transmission paths, wherein a data converter and a beamformer are disposed on each of the at least two data transmission paths, and a multiplexer is further disposed on the at least two data transmission paths; and, wherein the beamformer is configured to receive, by using the antenna bay, a radiation signal in a second preset beam direction over at least one antenna aperture of the beam aggregation structure, to demodulate the radiation signal to acquire a second analog signal, and to send the second analog signal to the data converter;

the data converter is configured to convert the radiation signal into a first digital signal; and the multiplexer is configured to set a data transmission path of the radiation signal.

17. The base station according to claim 16, wherein the multiplexer is disposed between the data converter and the beamformer on the at least two data transmission paths; and setting the data transmission path of the radiation signal by the multiplexer comprises:

selecting a beamformer and a data converter to form the data transmission path of the radiation signal;

or, wherein the multiplexer is disposed on a side that is of the at least two data transmission paths and on which the data converter outputs the first digital signal; and setting the data transmission path of the radiation signal by the multiplexer comprises:

selecting, as the data transmission path of the radiation signal, a data transmission path on which the data converter and the beamformer are disposed.

18. The base station according to claim 17, wherein the base station further comprises a beam controller configured to estimate, according to the second preset beam direction, a beam direction of a first area, the first area being adjacent to an area the second preset beam direction belongs to;

generate a first control signal; and send the first control signal to the multiplexer for controlling adjustment of the data transmission path to another data transmission path, wherein the another data transmission path is a data transmission path on which the beam direction of the first area is formed.

19. The base station according to claim 16, wherein the base station further comprises a beam controller configured to estimate, the second preset beam direction, a beam direction of a first area, the first area being adjacent to an area the second preset beam direction belongs to;

generate a first control signal; and send the first control signal to the multiplexer for controlling adjustment of the data transmission path to another data transmission path, wherein the another data transmission path is a data transmission path on which the beam direction of the first area is formed.

20. The base station according to claim 16, wherein the base station further comprises a beam controller configured to estimate, according to the second preset beam direction, a beam direction of a first area, the first area being adjacent to an area the second preset beam direction belongs to; and generate a first control signal; and, wherein if the first area belongs to a cell controlled by another base station, the beam controller is further configured to send the first control signal to a multiplexer of the another base station for controlling adjustment of a data transmission path of the another base station to a first data transmission path, wherein the first data transmission path is a data transmission path on which the beam direction of the first area is formed.

\* \* \* \* \*

UNITED STATES PATENT AND TRADEMARK OFFICE
CERTIFICATE OF CORRECTION

PATENT NO. : 9,820,166 B2
APPLICATION NO. : 15/244939
DATED : November 14, 2017
INVENTOR(S) : Guolong Huang et al.

It is certified that error appears in the above-identified patent and that said Letters Patent is hereby corrected as shown below:

On the Title Page

In (71) Applicant: HUAWEI TECHNOLOGIES CO., LTD., Guangdong (CN)
Please delete "Guangdong" and add "Shenzhen"

Signed and Sealed this
Nineteenth Day of June, 2018

Andrei Iancu
*Director of the United States Patent and Trademark Office*